J. N. TUTTLE.
RECORDER.
APPLICATION FILED SEPT. 9, 1919.
1,406,507.
Patented Feb. 14, 1922.
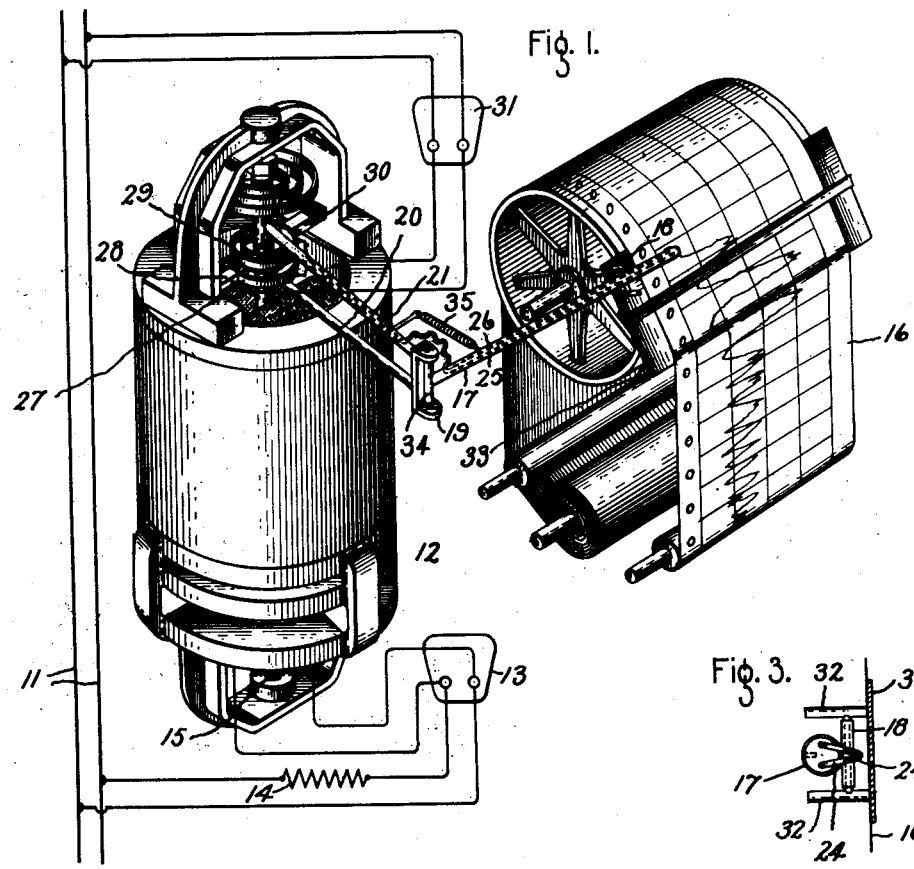
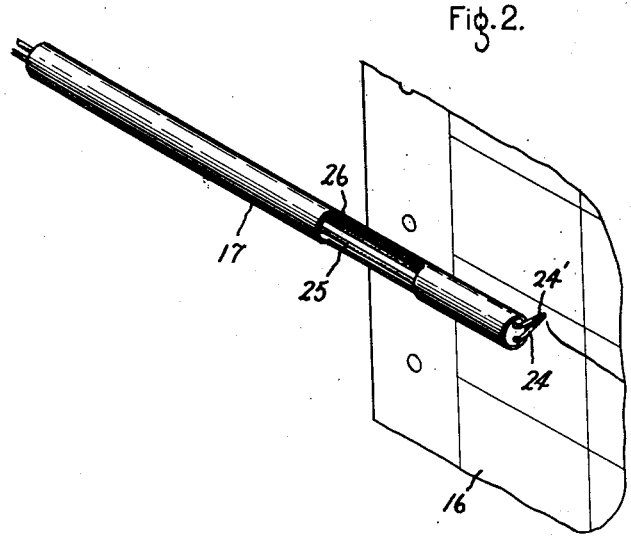
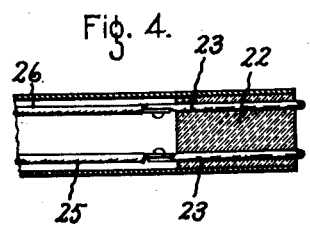
Inventor,
James N. Tuttle,
by Albert G. Davis
His Attorney.

UNITED STATES PATENT OFFICE.

JAMES N. TUTTLE, OF NEWTON CENTER, MASSACHUSETTS, ASSIGNOR TO GENERAL ELECTRIC COMPANY, A CORPORATION OF NEW YORK.

RECORDER.

1,406,507.  Specification of Letters Patent.  Patented Feb. 14, 1922.

Application filed September 9, 1919. Serial No. 322,604.

*To all whom it may concern:*

Be it known that I, JAMES N. TUTTLE, a citizen of the United States, residing at Newton Center, in the county of Middlesex, State of Massachusetts, have invented certain new and useful Improvements in Recorders, of which the following is a specification.

This invention relates to a novel marking device, and a method used in connection with recorders for securing a legible record without the use of ink or punch marks. The device that I have invented, it is to be understood, may be used upon any kind of recorder since it is entirely immaterial just what kind of quantity is being measured by the instrument.

Another object is to eliminate all contact, and therefore all friction between the record sheet and the stylus cooperating therewith, and thus insure accurate recording of the quantity measured.

Another object is to make the movable stylus as light in weight as possible.

Other objects and advantages will be apparent as the description of the invention proceeds.

In the accompanying drawing which illustrates my invention there is shown a curve drawing instrument for recording the voltage of an electric circuit. This particular kind of recording instrument is shown only by way of example as my device may be installed on any other type of curve drawing instrument.

Fig. 1 is a perspective view showing a general assembly of the instrument, record sheet and stylus; Fig. 2 is an enlarged view in perspective showing the stylus and the record sheet; Figs. 3 and 4 are detail views showing the manner in which the stylus is constructed.

Referring now more in detail to the drawings, in which like reference characters refer to like parts throughout, the voltmeter 12 is connected across the circuit 11 to measure the voltage thereof. The connection is made by means of the terminal board 13. A resistance 14 is placed in series with the voltmeter. The shaft 15 of the instrument is supported in suitable bearings, not shown. It is not deemed necesary to enter specifically into the structural details of the instrument 12, since these are immaterial as far as my invention is concerned.

A record sheet 16 is driven at a uniform rate by suitable clock work, not shown. The exposed surface of the record sheet is appropriately ruled and calibrated so that the value of the quantity measured may easily be ascertained at any point of the curve traced thereon. Appropriate marking means, such as a stylus is adapted to be guided over the surface of the record sheet. To support the recording means a roller 18 is provided. Forming a support for the roller 18 there are provided the posts 32 carried by a stationary part 33 of the record sheet support. The roller 18 guides a tube 17 carrying at its free extremity the marking stylus as it moves back and forth transversely of the record sheet 16.

The hollow tube 17 is fastened to a transverse shaft 34 pivoted at its ends in the U shaped member 19 which in turn is fastened to the rod 20. Said rod 20 is fastened to the shaft 15 of the instrument 12. As a further support for the member 19, a hollow rod 21 is provided, also connected to the shaft 15. The tube 17 is plugged at its forward end by a short cylinder of insulating material 22 provided with a pair of apertures for the reception of a thin wire 23. This thin wire forms a loop that extends outside of the tube, as clearly shown in Figs. 2 and 3. The loop is formed V-shaped so as to provide a pointed stylus 24 and said stylus is bent so that its plane is perpendicular to the plane of the record sheet 16. The tip 24' of the stylus is made of a proper kind of resistance metal so as to cause the tip to be heated at a passage of a current therethrough. As clearly shown in Fig. 3, the tip 24' of the stylus clears the upper surface of the record sheet 16 by an appreciable amount so that there can be no friction between the record sheet and the stylus. The heat of the stylus is insufficient to cause combustion of sheet 16.

A pair of leading-in wires 25 and 26 are electrically connected to the ends of the loop formed by the wire 23 and extend through the hollow tube 17 and also through the hollow tube 21. The wire 25 is electrically connected to the helical conductor 27 surrounding the shaft 15 of the instrument 12; said conductor in turn is electrically connected to the stationary post 28. In a similar way the wire 26 is connected to the conductor 29 which in turn is connected to post 30. The conductors 27 and 29 are oppositely wound so that their combined effect is not appreciable upon the operation of the instrument 12. The posts 28 and 30 are connected by a pair of conductors to an appropriate terminal block 31, which, in turn, serves to connect the wires with the source of supply 11. A spring 35, connected at its ends with members 17 and 21, serves to position said parts properly when the instrument 12 is in operation.

The exposed surface of the record sheet 16 is chemically prepared with a solution sensitive to heat. For example, in some of the devices I have tried I have successfully used for the sensitive medium a solution of normal copper nitrate but it is of course to be understood that any other solution which may be chemically altered by the application of heat may be used. The solution is applied to the surface, and when dry, said surface acquires a brownish stain if exposed to heat of a proper temperature, which temperature is considerably lower than that required to cause combustion of the sheet.

From the foregoing description of the apparatus, the operation of the device should be clear. As the voltmeter 12 responds to the variations in the voltage of the electric circuit 11, the shaft 15 takes up corresponding positions agreeing with such variations. The rods 20 and 21 connected to said shaft, in conjunction with parts 17, 19 and 34, serve to move the hollow tube 17 and the heated stylus transversely of the record sheet 16. As the heated stylus moves in close proximity to the sensitized surface, a chemical reaction takes place due to the heat radiated from the tip of the stylus, and a stain is produced upon the paper accurately recording the relative movements of the stylus and sheet. It is to be noted that the stylus may be heated by any well known means besides the passage of an electric current therethrough. The device is absolutely frictionless since the stylus is always out of contact with the sheet; at the same time a fairly thin line is obtained for the record since the stylus is so formed that the heat is fairly well localized and that portion of the record sheet only is altered which passes directly under the tip of the stylus.

While I have shown one particular embodiment of my invention, I do not wish to be limited thereto but desire to claim all modifications falling fairly within the scope of my invention.

What I claim as new and desire to secure by Letters Patent of the United States, is:

1. In a recorder, a record sheet, a stylus relatively movable thereto and out of contact therewith, means for heating said stylus, said record sheet having a surface sensitive to the heat radiated by the stylus, whereby a record is secured of the relative movement of the sheet and stylus.

2. In a recorder, a record sheet, a heated stylus relatively movable thereto, said sheet being out of contact with said stylus, and having a surface stained without burning by the radiation of heat from the stylus where the stylus and the surface approach closest together.

3. In a recorder, a record sheet, a stylus relatively movable thereto, means for passing an electric current through said stylus for heating it, said sheet being out of contact with said stylus, and having a chemically sensitized surface affected by the radiation of heat from the stylus where it and the surface approach closest together.

4. In a recorder, a record sheet adapted to be moved forward at a uniform rate, a stylus out of mechanical contact with said sheet, and adapted to be moved in accordance with a quantity to be measured, an electric circuit completed through said stylus for heating it, said sheet having a surface passing in close proximity to the stylus and being chemically sensitized so as to be colored by the radiation of heat from the stylus where it and the surface approach closest together.

5. The method of producing a record, which consists in making a surface of the record sheet sensitive to heat, bringing said sheet directly under a movable stylus but out of contact therewith, and heating said stylus so as to affect that portion of the surface immediately below said stylus.

In witness whereof, I have hereunto set my hand this fifth day of September, 1919.

JAMES N. TUTTLE.